US009799929B2

(12) United States Patent
Kawase et al.

(10) Patent No.: US 9,799,929 B2
(45) Date of Patent: Oct. 24, 2017

(54) APPARATUS, APPARATUS AUTHENTICATION MANAGEMENT SYSTEM AND APPARATUS AUTHENTICATION METHOD

(71) Applicants: Tsutomu Kawase, Kanagawa (JP); Yoshiaki Nishizaki, Kanagawa (JP); Yukiko Yamazaki, Kanagawa (JP); Takahisa Yamaguchi, Tokyo (JP)

(72) Inventors: Tsutomu Kawase, Kanagawa (JP); Yoshiaki Nishizaki, Kanagawa (JP); Yukiko Yamazaki, Kanagawa (JP); Takahisa Yamaguchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 239 days.

(21) Appl. No.: 14/407,561

(22) PCT Filed: Jun. 4, 2013

(86) PCT No.: PCT/JP2013/065904
§ 371 (c)(1),
(2) Date: Dec. 12, 2014

(87) PCT Pub. No.: WO2013/187340
PCT Pub. Date: Dec. 19, 2013

(65) Prior Publication Data
US 2015/0162646 A1 Jun. 11, 2015

(30) Foreign Application Priority Data
Jun. 13, 2012 (JP) .................................. 2012-133507

(51) Int. Cl.
*H01M 10/42* (2006.01)
*B25F 5/00* (2006.01)
(Continued)

(52) U.S. Cl.
CPC .......... *H01M 10/4257* (2013.01); *B25F 5/00* (2013.01); *H01M 2/1022* (2013.01);
(Continued)

(58) Field of Classification Search
CPC ..... H01M 10/4257; H01M 2010/4271; H01M 2010/4278
See application file for complete search history.

(56) References Cited

U.S. PATENT DOCUMENTS 7,784,104 B2    8/2010  Innami et al.
2005/0035659 A1 2/2005  Hahn et al.
(Continued)

FOREIGN PATENT DOCUMENTS

EP      0985596 A2      3/2000
JP      2004-181549     7/2004
(Continued)

OTHER PUBLICATIONS

International Search Report dated Sep. 10, 2013 in PCT/JP2013/065904 filed on Jun. 4, 2013.
(Continued)

*Primary Examiner* — Nabil Syed
(74) *Attorney, Agent, or Firm* — Cooper & Dunham LLP

(57) ABSTRACT

An apparatus includes an apparatus body and a battery pack removable from the apparatus body. Each of the apparatus body and the battery pack includes a memory unit configured to store a use permission flag written after authentications for a pair of the apparatus body and the battery pack through near field communication with a portable terminal, and a control unit configured to permit energization when the use permission flag of the memory unit is ON.

15 Claims, 16 Drawing Sheets

(51) Int. Cl.
*H01M 2/10* (2006.01)
*H01M 10/48* (2006.01)
*G07C 9/00* (2006.01)

(52) U.S. Cl.
CPC ........ *H01M 10/48* (2013.01); *G07C 9/00007* (2013.01); *H01M 2010/4271* (2013.01); *H01M 2010/4278* (2013.01)

(56) References Cited

U.S. PATENT DOCUMENTS

| | | |
|---|---|---|
| 2007/0252675 A1 | 11/2007 | Lamar |
| 2010/0171460 A1 | 7/2010 | Nakajima et al. |
| 2010/0185357 A1* | 7/2010 | Mizumachi ......... B60L 11/1816 701/31.4 |
| 2011/0078092 A1* | 3/2011 | Kim ................... B60L 11/1824 705/412 |
| 2012/0044088 A1 | 2/2012 | Watanabe et al. |
| 2012/0049785 A1 | 3/2012 | Tanaka |
| 2013/0141217 A1* | 6/2013 | Goren ...................... G06K 7/01 340/10.1 |

FOREIGN PATENT DOCUMENTS

| | | |
|---|---|---|
| JP | 4678199 | 4/2011 |
| JP | 2012-027594 | 2/2012 |
| JP | 2012-043440 | 3/2012 |
| JP | 2012-061543 | 3/2012 |
| WO | WO2008/153138 | 12/2008 |

OTHER PUBLICATIONS

Jun. 8, 2015 European search report in corresponding European Patent Application No. 13804402.

* cited by examiner

FIG.6

| TABLE | SHIPPING PRODUCT SERIAL ID | USE PERMISSION FLAG (COUNT NUMBER) | CONNECTING PRODUCT ID #1 | CONNECTING PRODUCT ID #2 | CONNECTING PRODUCT ID #n | SMART PHONE ID #1 ... #n | USE START DAY AND TIME | ENERGIZING TIME | MAINTENANCE INFORMATION #1 | MAINTENANCE INFORMATION #2 | KEY INFORMATION FOR ENCRYPTION |
|---|---|---|---|---|---|---|---|---|---|---|---|
| TOOL BODY | XXXXXXXX RECORDED AT THE TIME OF SHIPPING (NO CHANGE) | X | XXXXXXXX BATTERY ID WRITTEN AT AUTHENTICATION (SUBJECT TO CHANGE) | XXXXXXXX BATTERY ID WRITTEN AT AUTHENTICATION (SUBJECT TO CHANGE) | XXXXXXXX BATTERY ID WRITTEN AT AUTHENTICATION (SUBJECT TO CHANGE) | XXXXXXXX SMART PHONE ID AT THE PAIRING | 201X/XX/XX DAY AND TIME OF THE FIRST AUTHENTICATION | XXXXXXXX ACCUMULATED OPERATION TIME | XX201XXXXX MAINTENANCE NUMBER, MAINTENANCE YEAR/MONTH/DAY/TIME, MAINTENANCE RECORD | XX201XXXXX MAINTENANCE NUMBER, MAINTENANCE YEAR/MONTH/DAY/TIME, MAINTENANCE RECORD | XXXXX |
| BATTERY PACK | XXXXXXXX RECORDED AT THE TIME OF SHIPPING (NO CHANGE) | X | XXXXXXXX TOOL BODY ID WRITTEN AT AUTHENTICATION (SUBJECT TO CHANGE) | XXXXXXXX TOOL BODY ID WRITTEN AT AUTHENTICATION (SUBJECT TO CHANGE) | XXXXXXXX TOOL BODY ID WRITTEN AT AUTHENTICATION (SUBJECT TO CHANGE) | XXXXXXXX SMART PHONE ID AT THE PAIRING | 201X/XX/XX DAY AND TIME OF THE FIRST AUTHENTICATION | XXXXXXXX ACCUMULATED BATTERY DISCHARGE COUNT | XXXX BATTERY VOLTAGE AT FULL CHARGE | XXXX BATTERY FATIGUE LEVEL | XXXXX |

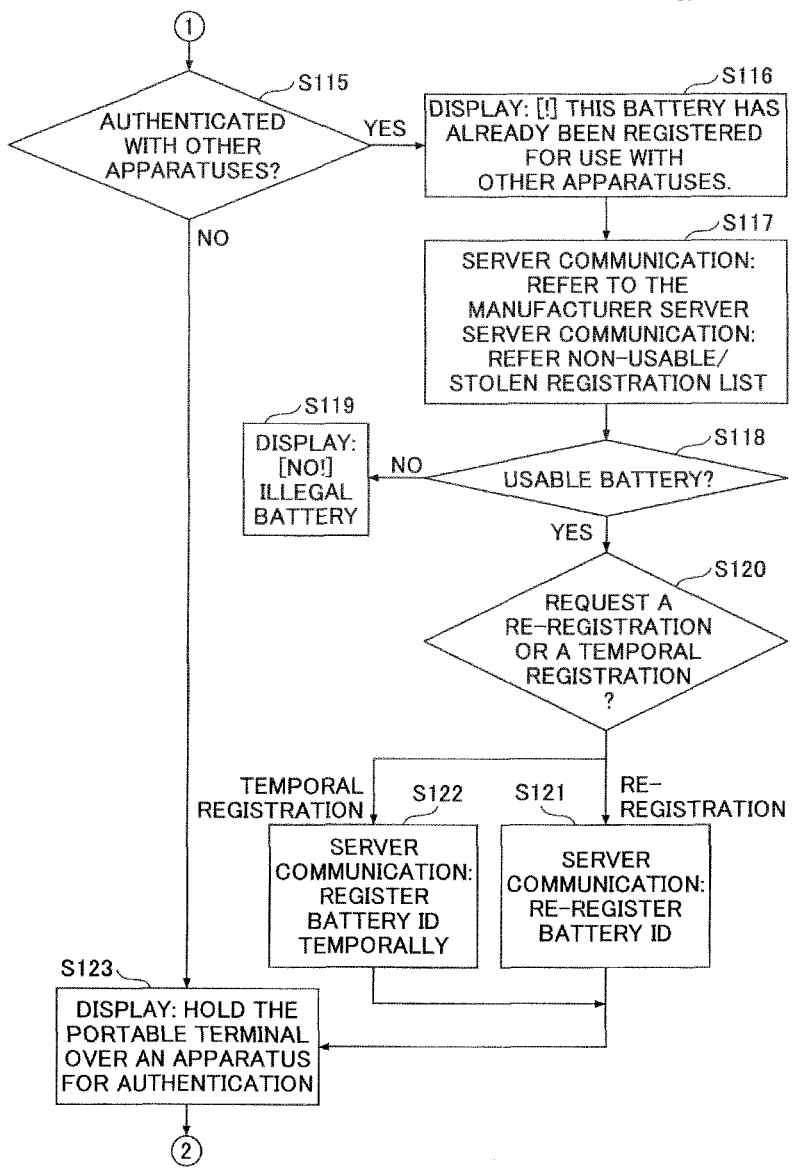

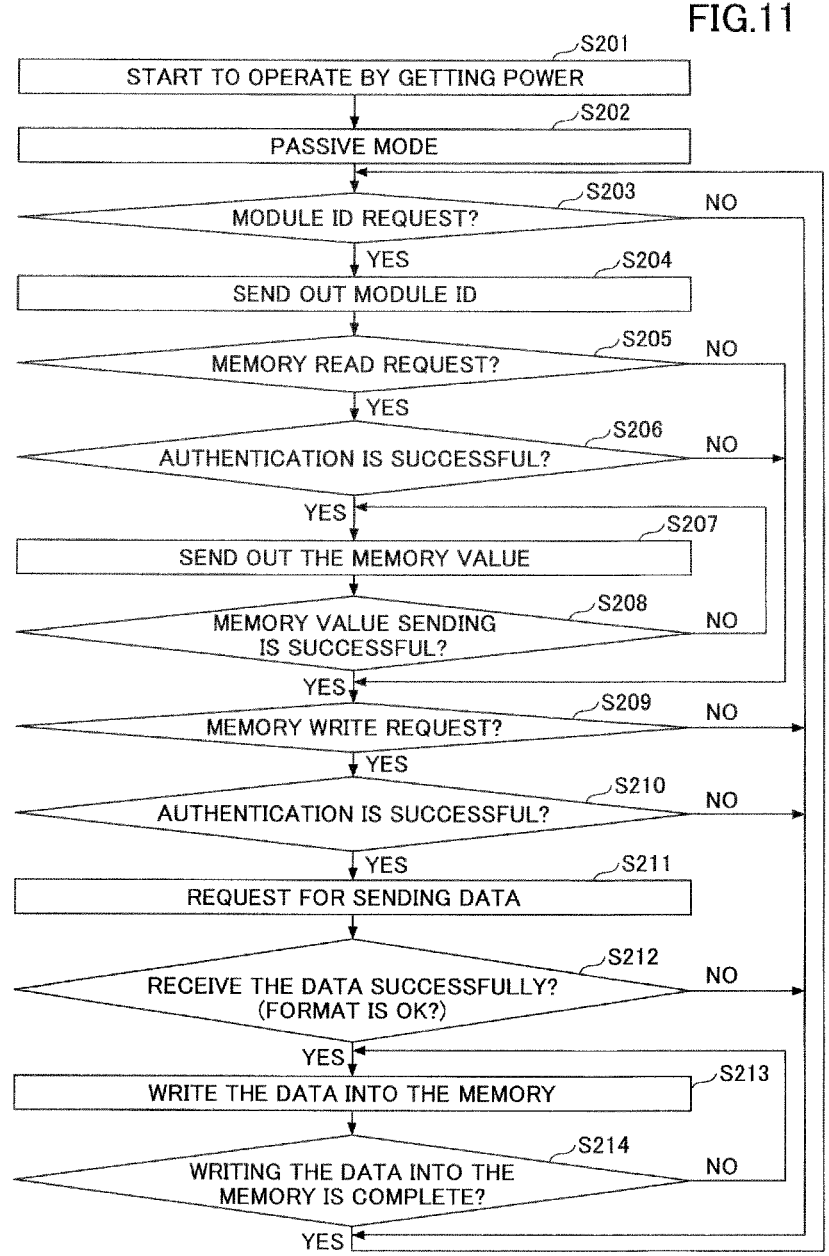

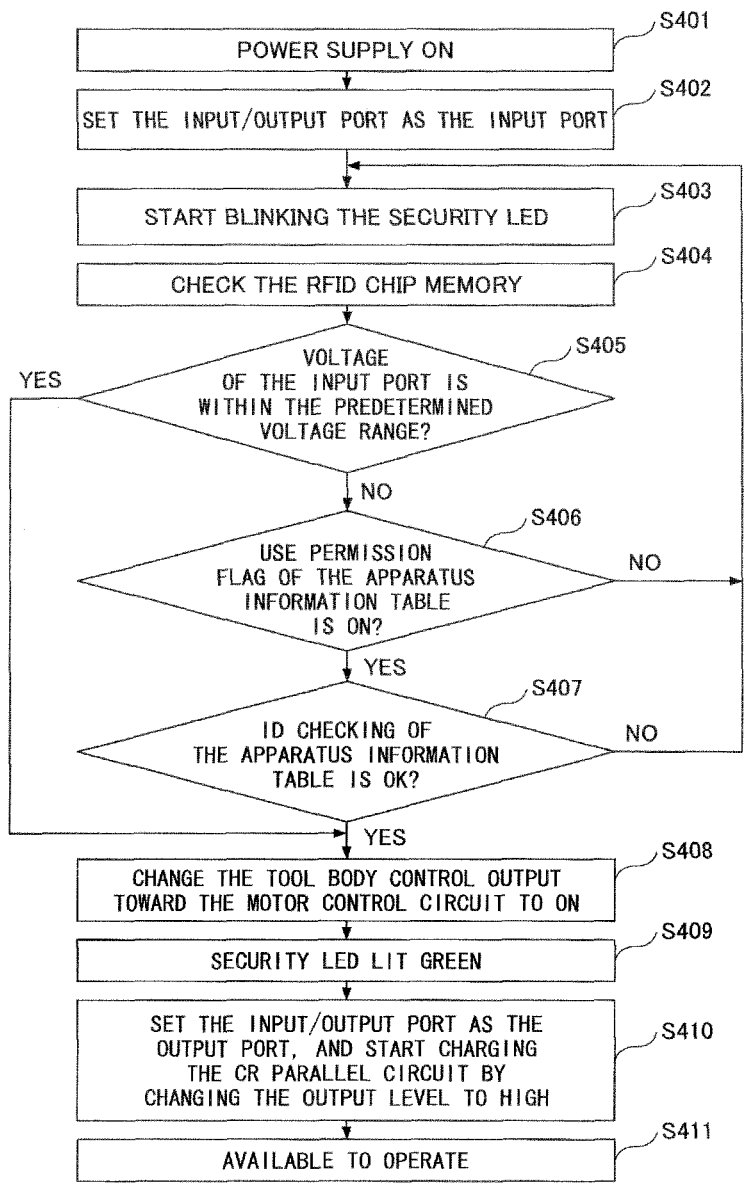

APPARATUS, APPARATUS AUTHENTICATION MANAGEMENT SYSTEM AND APPARATUS AUTHENTICATION METHOD

TECHNICAL FIELD

The disclosures herein generally relate to a controlling technology for an apparatus with removable battery.

BACKGROUND ART

Electric power tools for professionals have advantages such that their power supply has longer battery life and more power, but have a disadvantage such that they are expensive. Therefore they often become a good target for stealing and reselling. Their size is small enough to be carried by hand, which makes them easy to steal. Also it is often the case that they are taken away by someone by mistake, or that they are just misplaced somewhere and lost. As a result, even if they are not a target of stealing and reselling at the beginning, they end up becoming a good target for reselling.

Moreover, main users of electric power tools are people from construction industries and upholstery industries. People of these industries are often of small businesses. It is often the case that electric power tools do not belong to their company but belong to them personally. Especially, the working environment for these people from construction industries and upholstery industries is such that many people work together at the same place. They have to make sure by themselves that they don't have their electric power tools stolen or lost.

Electric power tools with batteries now have longer battery life and higher battery power because of adoption of lithium-ion batteries. Such a tool carries a risk of a serious accident triggered by a battery fire incident because of its high energy when a battery (which is recommended for use by the manufacturer of the tool) is defective or when a reproduced battery or a compatible battery, which is different from the recommended battery, is used.

There are several methods to prevent having electric power tools stolen, such as:

(1) a method of fixing an electric power tool to some fixed object, using something like a hard wire;
(2) a method of locking and unlocking by entering a correct sequence of numbers through key operations; and
(3) a method of locking and unlocking by touching some electrical key, such as a wireless remote control, an IC card, or near field RFID card.

But the above method (1) does not work if there is no fixed object around to be fixed to the electric power tool, and it is required to buy something like a hard wire, which is a financially heavy burden for the user. The user has to fix the electric power tool to some fixed object every time he/she leaves it, which is cumbersome for him/her.

The above methods (2) and (3) may have a good effect making those people, who try to steal the electric power tool, give up stealing because they may think, even if they successfully steal the electric power tool, they cannot use it because it is locked.

But the above method (2) has never been commercially realized because of its operational difficulties of entering the key and its additional cost in the mean time, Patent Document 1 discloses such a configuration that, as an example of the above method (2), using an identification code input as a key input, switching between the normal operation mode and the operation prevented mode, a user can use the electrical power tool only when the correct key is entered.

Also, the above method (3) has never been commercially realized because of its additional cost for additional apparatuses such as a remote controller or a card, or because of the reason that it is easy to forget to carry the remote controller or it is easy to lose it.

In the mean time, in order to prevent accidents caused by a low quality battery, it is required to have a function to check whether the battery is recommended by the manufacturer or not. The above Patent Document 1 discloses a configuration of setting the same ID number in both the removable unit (such as a battery) and the tool body. If the two ID numbers of the removable unit and the tool body are not the same, then the mode is switched to the operation prevented mode.

However, the configuration disclosed in Patent Document 1 may not work well with the reproduced battery, in which the battery cell is changed and the battery circuit is not changed. Also, this configuration may not k well with the case where more than one of the batteries are used with one tool body or where one battery is used with many different tool bodies.

The present invention is proposed to solve these problems. It is a general object of the present invention to provide a method to prevent having electric power tools stolen, by using an operationally advantageous electric key. Another object is to make it difficult to forget or lose the electric key. Yet another object is to handle various combinations of the battery pack and the tool body. Yet another object is to effectively prevent accidents caused by low quality batteries, and to use a small number of additional parts for achieving the low cost.

DISCLOSURE OF THE INVENTION

It is a general object of at least one embodiment of the present invention to provide an apparatus that substantially obviates one or more problems caused by the limitations and disadvantages of the related art.

In one embodiment, an apparatus includes an apparatus body and a battery pack removable from the apparatus body, wherein each of the apparatus body and the battery pack includes a memory unit configured to store a use permission flag written after authentications for a pair of the apparatus body and the battery pack through near field communication with a portable terminal, and a control unit configured to permit energization when the use permission flag of the memory unit is ON.

In one embodiment of the present invention, a method is provided to prevent having electric power tools stolen, by using an operationally advantageous electric key. With this method, it is difficult to forget or lose the electric key. Various combinations of the battery pack and the tool body can be handled. Accidents caused by low quality batteries can be effectively prevented. And low cost is achieved by using a small number of additional parts.

BRIEF DESCRIPTION OF THE DRAWINGS

Other objects and further features of embodiments will be apparent from the following detailed description when read in conjunction with the accompanying drawings, in which:

FIG. 6 is a drawing illustrating an example of data configuration of an apparatus information table stored in a tool body or in a battery pack;

FIGS. 7A, 7B, and 7C are a flowchart (No. 1) illustrating an example of a process of a smart phone as a portable terminal;

FIG. 11 is a flowchart illustrating an example of a process of a RFID chip;

FIG. 13 is a flowchart illustrating an example of a process of a CPU embedded in a tool body.

MODE FOR CARRYING OUT THE INVENTION

Although the present invention has been described with reference to embodiments, the present invention is not limited to these embodiments, but various variations and modifications may be made without departing from the scope of the invention as set forth in the accompanying claims.

Figure 1:
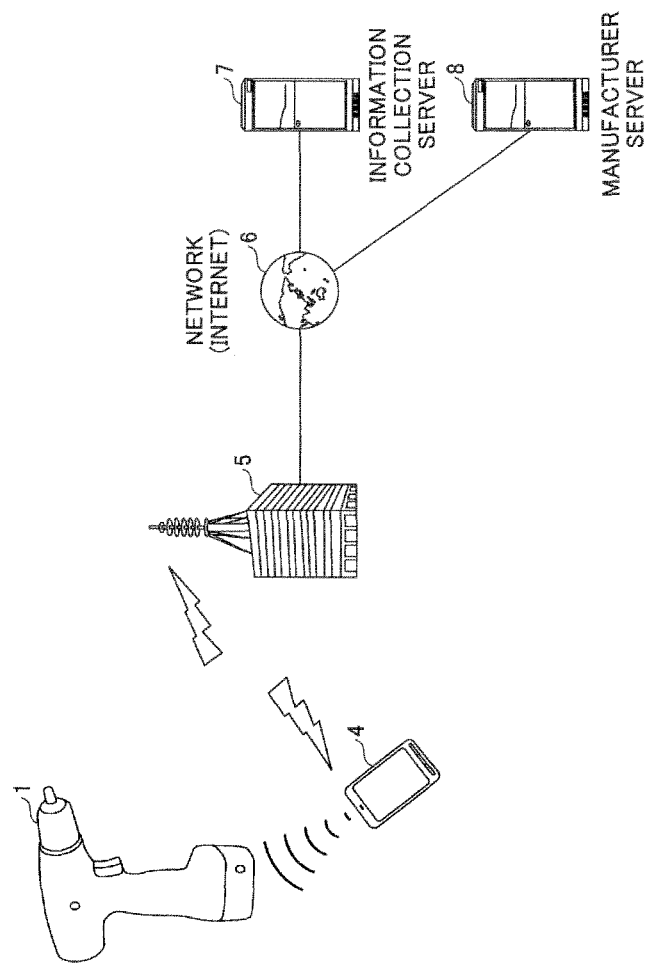
FIG. 1 is a drawing illustrating n example of a system configuration according to an embodiment.

In the following, embodiments of the present invention will be described with reference to the accompanying drawings.
<Configurations>
FIG. 1 is a drawing illustrating an exemplary system configuration according to an embodiment.

In FIG. 1, a portable terminal 4, such as a smart phone, has access to an RFID chip embedded in an electric power tool 1 through a dedicated application (program). The portable terminal 4, when having access to the electric power tool 1, also has access to an information collection server 7 or manufacturer server 8 through an access point 5 such as a cellular base station or a Wi-Fi hot spot, and a network 6 such as the Internet.

While the portable terminal 4 is capable of working as an electrical key for allowing only a qualified user to use the electric power tool, it is also capable of working as a unit to register new apparatuses (a tool body and a battery pack which constitute the electric power tool 1). It is also capable of checking whether a tool body and a battery pack can be suitably connected and used together, and capable of checking the status of apparatuses.

The information collection server 7 has a function of maintaining identification (ID) information and apparatus information for each of a tool body and a battery pack which constitute the electric power tool 1. The manufacturer server 8 is a server for maintaining information prepared by the manufacturer that manufactures the electric power tool 1. Necessary information is extracted from the information collection server 7 and stored in the manufacturer server 8.

Figure 2:
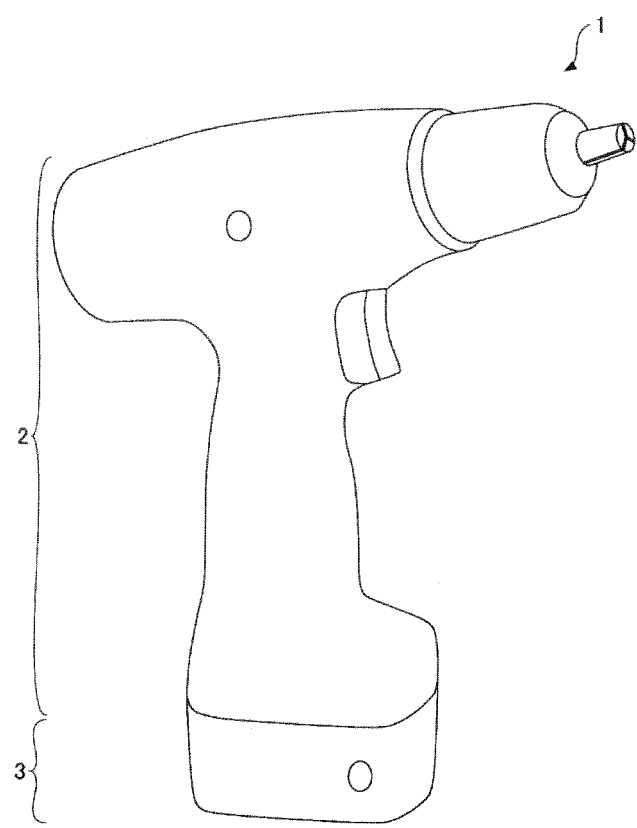
FIG. 2 is a drawing illustrating an example of a perspective view of an electric power tool.

FIG. 2 is a drawing illustrating an example of a perspective view of the electric power tool 1.

In FIG. 2, the electric power tool 1 includes a tool body 2 comprised of main parts such as a motor, and includes a battery pack 3 which is removable from the tool body 2.

Figure 3:
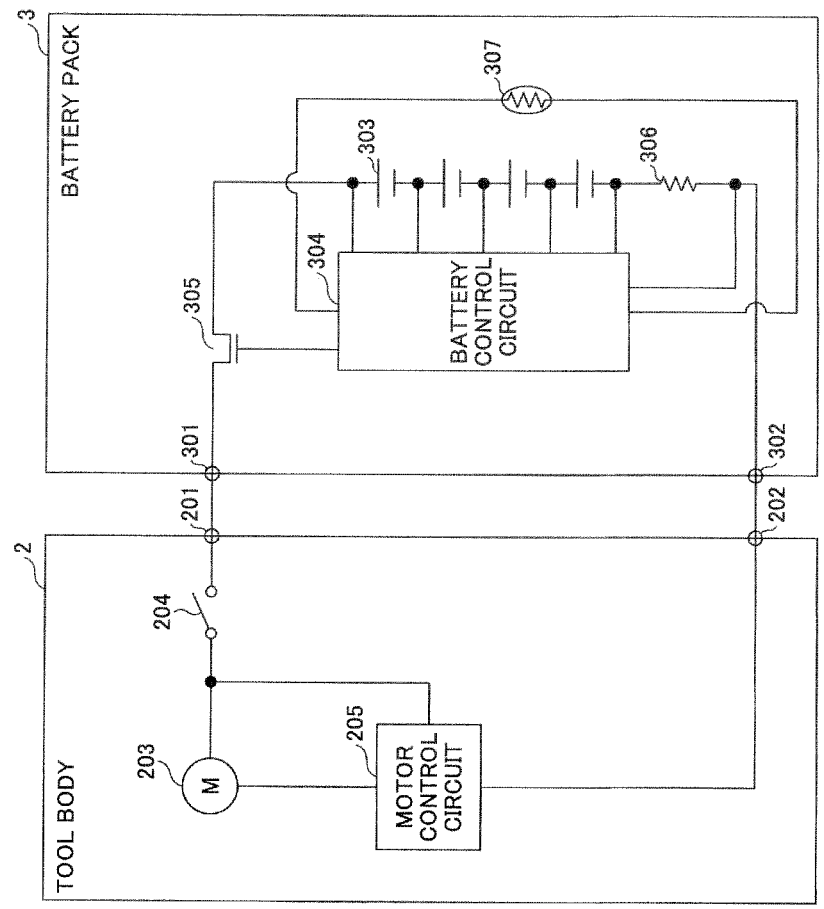
FIG. 3 is a drawing illustrating an example of a schematic internal configuration of an electric power tool.

FIG. 3 is a drawing illustrating an example of a schematic internal configuration of the electric power tool 1.

In FIG. 3, the tool body 2 includes a switch 204 which is connected between one of the two ends of a motor 203 and an external connection terminal 201. A main route of a motor control circuit 205 is formed between an external connection terminal 202 and the other end of the motor 203. The power supply terminal of the motor control circuit 205 is connected to a connection point between the motor 203 and the switch 204. The earth line of the motor control circuit 205 is connected to the external connection terminal 202.

While the power voltage is being provided by the battery pack 3, by making the switch 204 ON, the motor control circuit 205 receives power to start its operation. The motor control circuit 205 then controls the motor drive by controlling the amount of the current supplied to the motor 203.

The battery pack 3 has a transistor 305 serving as a main route, which is formed between an external connection terminal 301 and one of the two ends of multi-layered (e.g. four layers in the figure) battery cells 303. A resistor 306 for detecting current is connected between an external connection terminal 302 and the other end of the battery cells 303. A battery control circuit 304 is connected to the two ends of each of the battery cells 303 and the resistor 306, and is also connected to both ends of a thermistor 307 located adjacent to the battery cells 303. An output terminal of the battery control circuit 304 is connected to a control terminal of the transistor 305. The ground line of the battery control circuit 304 is connected to the external connection terminal 302.

The battery control circuit 304 operates with power from the battery cells 303, controls the transistor 305, and controls the output of voltage and current from the battery pack 3 based on voltages from each of the cells, the current detected by the resistor 306, and the temperature detected by the thermistor 307.

Figure 4:
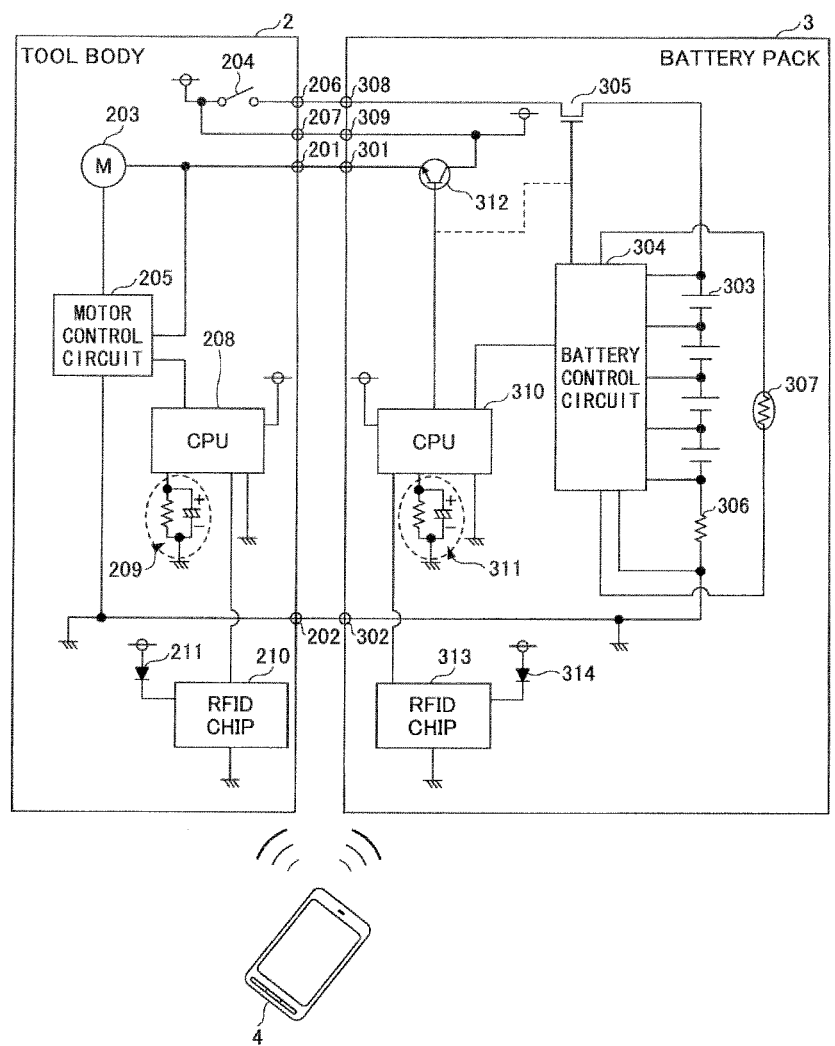
FIG. 4 is a drawing illustrating an example of a schematic internal configuration of an electric power tool of an embodiment.

FIG. 4 is a drawing illustrating an example of the schematic internal configuration of the electric power tool 1 of the present embodiment.

In FIG. 4, the tool body 2 has one of the two ends of the motor 203 connected to the external connection terminal 201, and has the other end of the motor 203 connected to the external connection terminal via the main route of the motor control circuit 205. The external connection terminal 202 is connected to ground. A switch 204 is connected between an external connection terminal 206 and an external connection terminal 207. The external connection terminal 207 is connected to a power line for a CPU 208 and other circuits. The CPU 208 will be described further below.

The tool body 2 has the CPU 208 which controls the motor control circuit 205. Between the input/output port (controllable to switch between input and output) of the CPU 208 and ground, a CR parallel circuit 209 is connected for determining, from the remaining voltage, the elapsed time from the last normal usage. The power supply terminal of the CPU 208 is connected to the power line and the ground terminal of the CPU 208 is connected to ground.

The tool body 2 has an RFID chip 210, whose internal memory (non-volatile memory such as flash memory) can be read or written to by the CPU 208. A diode 211, which is connected between the power supply terminal of the RFID chip 210 and the power line, is provided for reverse flow protection. When the RFID chip 210 receives electromagnetic waves and generates the power by itself, the diode 211 protects the current from flowing back to the power line. The ground terminal of the RFID chip 210 is connected to ground.

The battery pack 3 has a main route of the transistor 305, which is formed between an external connection terminal 308 and one of the two ends of multi-layered (e.g. four-layered in the figure) battery cells 303, and has the resistor 306 for detecting current which is connected between the external connection terminal 302 and the other end of the battery cells 303. The battery control circuit 304 is connected to the two ends of each of the battery cells 303 and the resistor 306, and is also connected to both ends of the thermistor 307 located adjacent to the battery cells 303. An output terminal of the battery control circuit 304 is connected to a control terminal of the transistor 305. The external connection terminal 302 is connected to ground.

A main route of a transistor 312 is connected between the external connection terminal 301 and an external connection terminal 309. The external connection terminal 309 is connected to the power line for a CPU 310 and other circuits. The CPU 310 will be described further below.

The battery pack 3 has the CPU 310, which controls the battery control circuit 304. A control output terminal of the CPU 310 is connected to the control terminal of the transistor 312. In some cases, the transistor 312 may be omitted and the control output terminal of the CPU 310 may be connected to the control terminal of the transistor 305.

Between the input/output port (controllable to switch between input port and output port) of the CPU 310 and ground, a CR parallel circuit 311 is connected for determining, from the remaining voltage, the elapsed time from the last normal usage. The power supply terminal of the CPU 310 is connected to the power line and the ground terminal of the CPU 310 is connected to ground.

The battery pack 3 has an RFID chip 313, whose internal memory (non-volatile memory such as flash memory) can be read or written to by the CPU 310. A diode 314, which is connected between the power supply terminal of the RFID chip 313 and the power line, is provided for reverse flow protection. When the RFID chip 313 receives electromagnetic waves and generates the power by itself, the diode 314 protects the current from flowing back to the power line. The ground terminal of the RFID chip 313 is connected to ground.

Figure 5:
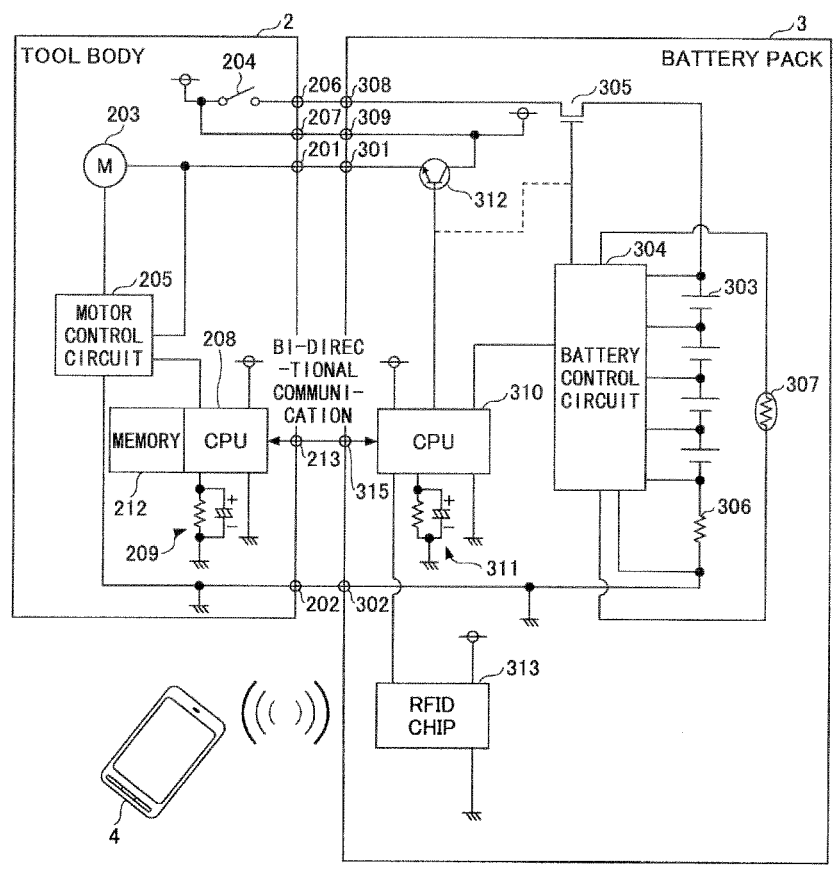
FIG. 5 is a drawing illustrating an example of a schematic internal configuration of an electric power tool of another embodiment.

FIG. 5 is a drawing illustrating another example of the schematic internal configuration of the electric power tool 1 of the present embodiment.

In FIG. 5, compared to the configuration of FIG. 4, the RFID chip 210 and the diode 211 are omitted from the tool body 2. Instead, the CPU 208 has a memory 212 (non-volatile memory such as flash memory). Also, the CPU 208 is capable of bi-directionally communicating with the CPU 310 of the battery pack 3 through an external connection terminal 213.

In the battery pack 3, the CPU 310 is capable of bi-directionally communicating with the CPU 203 of the tool body 2 through an external connection terminal 315. The power supply terminal of the RFID chip 313 is directly connected to the power line. With this configuration, when the RFID chip 313 receives electromagnetic waves and generates the power by itself, both the CPU 310 of the battery pack 3 and the CPU 208 of the tool body 2 are capable of operating and able to communicate bi-directionally even if the power supply is OFF (or the switch 204 is OFF).

FIG. 6 is a drawing illustrating an example of a data configuration of an apparatus information table stored in the tool body 2 or battery pack 3. With the tool body 2 in FIG. 4, the apparatus information table is stored in the memory of the RFID chip 210. With the battery pack 3 in FIG. 4, the apparatus information table is stored in the memory of the RFID chip 313. With the tool body 2 in FIG. 5, the apparatus information table is stored in the memory 212. With the battery pack 3 in FIG. 5, the apparatus information table is stored in the memory of the RFID chip 313.

In FIG. 6, the apparatus information table has those items like "shipping product serial ID", "use permission flag (count number)", "connecting product ID #1", "connecting product ID #2", . . . , "connecting product ID #n", "smart phone ID #1 . . . #n", "use start day and time", "energizing time", "maintenance information #1", "maintenance information #2", "key information for encryption", etc.

"Shipping product serial ID" is information for identifying the product (apparatus). This ID is a "tool body ID" in the apparatus information table stored in the tool body 2, and is a "battery ID" in the apparatus information table stored in the battery pack 3. "Use permission flag (count number)" is set to "ON(1)" when the use of the apparatus is permitted. "Connecting product ID #1", "connecting product ID #2", . . . , "connecting product ID #n" are the information items for identifying the connectable apparatuses which can be connected to the apparatus. "Smart phone ID #1 . . . #n" is the information for identifying the pairing of smart phones (portable terminals 4) which have been paired to the apparatus. "Use start day and time" is the day and time information for the first successful authentication.

"Energizing time" is the information for accumulated usage time of the apparatus. With the apparatus information table stored in the tool body 2, accumulated operation time is recorded as "Energizing time" With the apparatus information table stored in the battery pack 3, accumulated battery discharge count is recorded as "Energizing time". "Maintenance information #1" and "maintenance information #2" are pieces of information for maintenance of the apparatus. With the apparatus information table stored in the tool body 2, maintenance records, such as maintenance number or maintenance year, month and day, are recorded. With the apparatus information table stored in the battery pack 3, battery voltage at full charge, battery fatigue level, and the like are recorded. "Key information for encryption" is the information used for encryption for communication with the outside.

<Operation>

FIGS. 7A-7C and FIGS. 8A-8B are flowcharts illustrating examples of processes of a smart phone as the portable terminal 4.

Figure 7A:
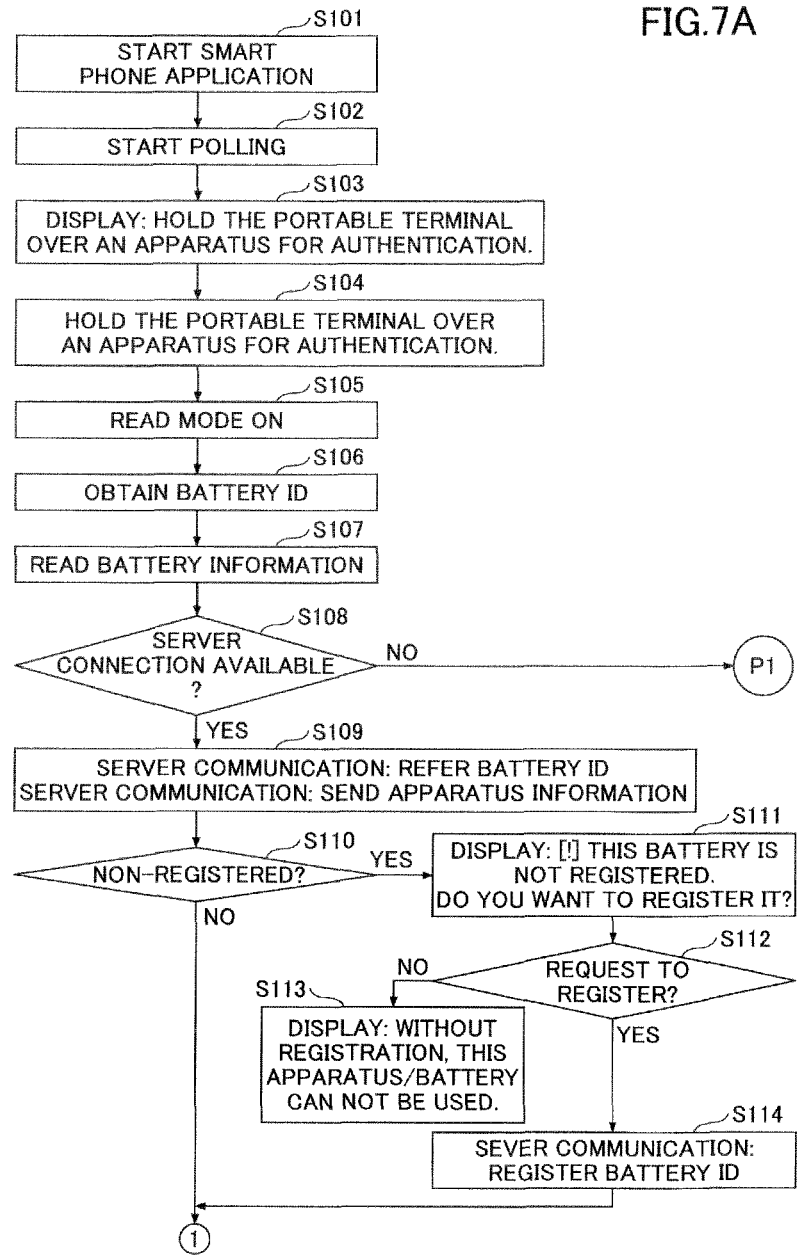
Figure 7C:
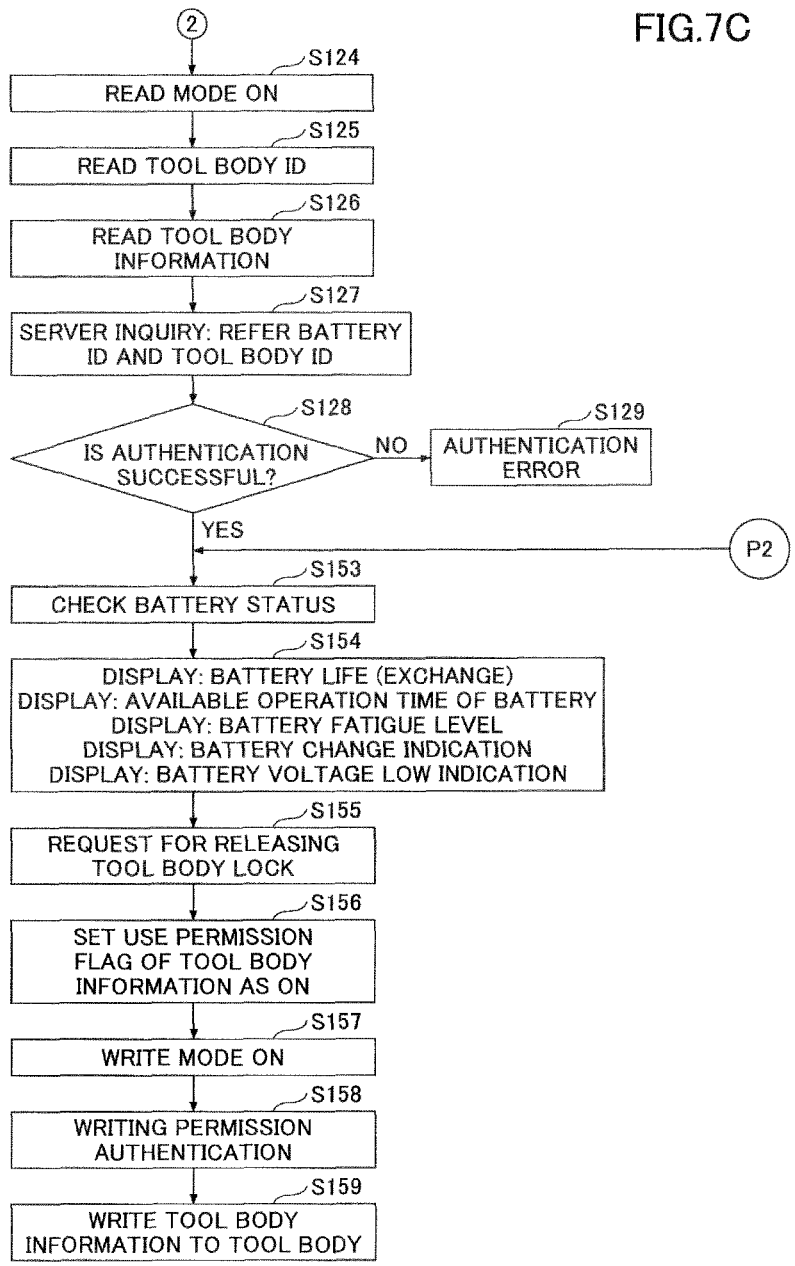

In FIGS. 7A-7C, as soon as a user starts a specific application, the portable terminal 4 starts the process (Step S101). Using the near field radio communication function, the portable terminal starts polling nearby RFID chips (Step S102).

Then, the portable terminal 4 displays, for example, "Hold the portable terminal over an apparatus for authentication." (Step S103).

When the user holds the portable terminal 4 over the battery pack 3 (Step S104), then the portable terminal 4 switches its near field radio communication function's Read mode to ON, obtains the battery ID from the apparatus information table of the battery pack 3, and reads out various other types of battery information (Step S107).

Then, the portable terminal 4 determines whether the server connection is available.

If it determines that the server connection is available (Yes for Step S108), then it refers to the server for the battery ID and sends the apparatus information to the server through server communication (Step S109).

As a result of referring to the battery ID, it is not registered in the information collection server 7 (Yes for Step S110), then the portable terminal 4 displays, for example, "[!] This battery is not registered. Do you want to register it?" (Step S111).

If a user does not request the registration (No for Step S112), then the portable terminal 4 displays, for example, "Without registration, this apparatus/battery cannot be used." (Step 2113), and ends the process.

If a user request the registration (Yes for Step S112), then the portable terminal 4 registers the battery ID through server communication (Step S114).

When the battery ID has already been registered (No for Step S110), or when the new registration is finished (Step S114), the portable terminal 4 determines whether the battery ID has already been authenticated with other apparatuses (Step S115).

If the portable terminal 4 determines that the battery ID has already been authenticated with other apparatuses (Yes for Step S115), then the portable terminal 4 displays, for example, "[!] This battery has already been registered for use with other apparatuses." (Step S116).

Then the portable terminal 4 refers to the manufacturer server 8 through server communication for the non-usable/stolen registration list (Step S117). If the battery is not a usable battery (No for Step S118), then it displays, for example, "[No!] illegal battery" (Step S119), and ends the process.

If the battery is a usable battery (Yes for Step S118), then the portable terminal 4 asks the user whether he/she requests a re-registration or a temporal registration (Step S120). If the re-registration is requested, then the portable terminal 4 performs re-registration for the battery ID through server communication. If the temporal registration is requested, then the portable terminal 4 performs temporal registration for the battery ID through server communication.

When the portable terminal 4 determines that the battery ID has not been authenticated with other apparatuses (No for Step S115) or when the re-registration or the temporal registration is finished (Step S121, S122), the portable terminal 4 displays, for example, "Hold the portable terminal over an apparatus for authentication." (Step S123)

When the user holds the portable terminal 4 over the tool body 2, the portable terminal 4 switches its near field radio communication function's Read mode to ON (Step S124), obtains the tool body ID from the apparatus information table of the tool body 2 (Step S125), and reads out various other types of tool body information (Step S126).

Then, the portable terminal 4 refers to the server for the battery ID and the tool body ID through server query (Step S127).

If the authentication is not successful (No for Step S128), as a result of an authentication error, the portable terminal 4 ends the process (Step S129).

Figure 8A:
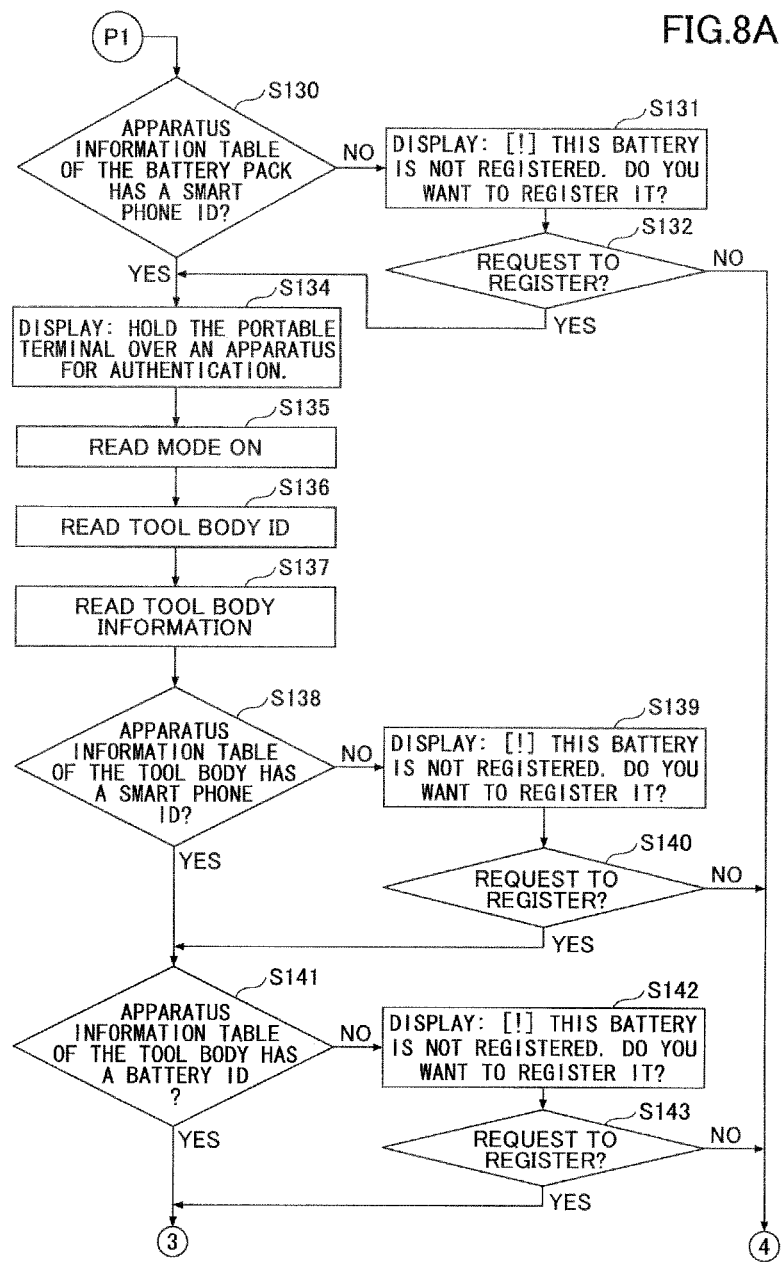
FIGS. 8A and 8B are a flowchart (No. 2) illustrating an example of a process of a smart phone as a portable terminal.
Figure 8B:
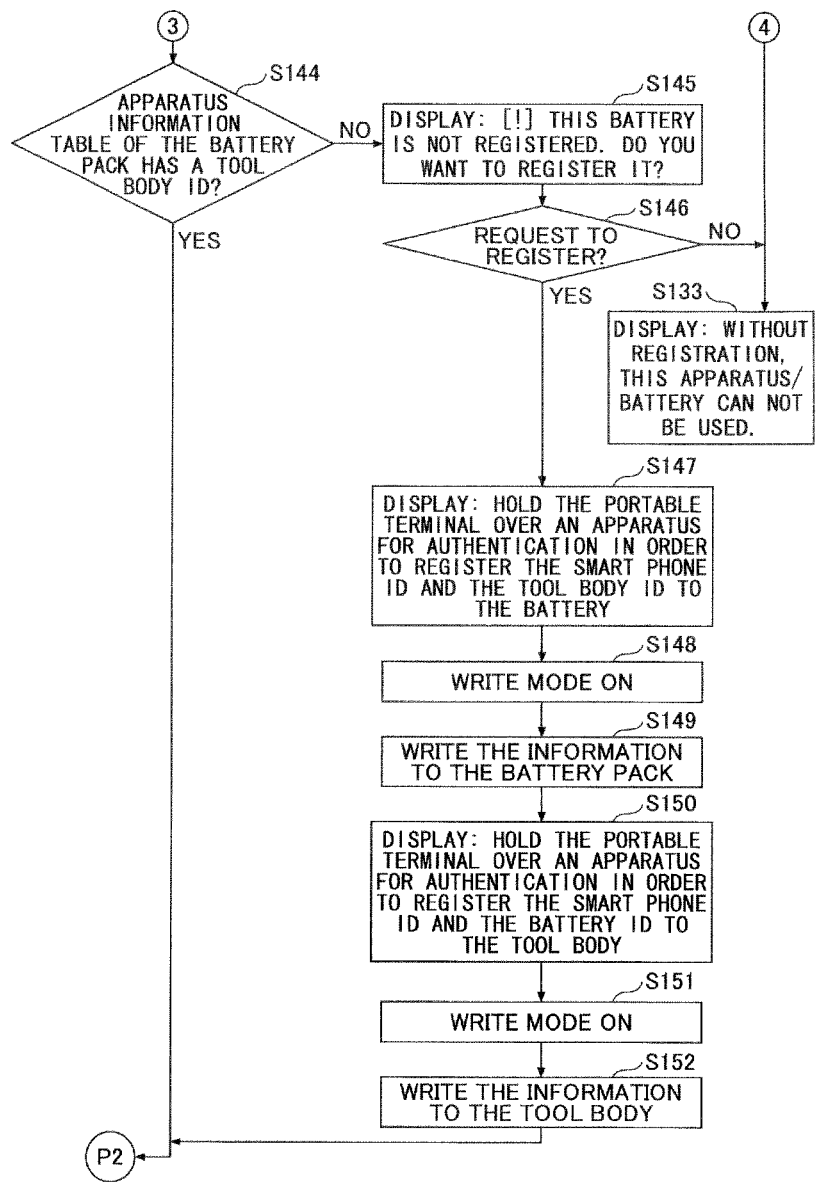

On the other hand, if it determines that the server connection is not available (No for Step S108), as shown in FIGS. 8A and 8B, the portable terminal 4 determines whether the apparatus information table of the battery pack 3 has a smart phone ID (Step S130).

If it determines that the apparatus information table of the battery pack 3 does not have a smart phone ID (No for Step S130), then the portable terminal 4 displays, for example, "[!] This battery is not registered. Do you want to register it?" (Step S131). If the user does not request the registration (No for Step S132), then the portable terminal 4 displays, for example, "Without registration, this apparatus/battery can not be used." (Step S133) and ends the process.

If it determines that the apparatus information table of the battery pack 3 has a smart phone ID (Yes for Step S130), or if the user requests the registration (Yes for S132), then the portable terminal 4 displays, for example, "Hold the portable terminal over an apparatus for authentication." (Step S134)

When the user holds the portable terminal 4 over the tool body 2, the portable terminal 4 switches its near field radio communication function's Read mode to ON (Step S135), obtains the tool body ID from the apparatus information table of the tool body 2 (Step S136), and reads out various other types of tool body information (Step S137).

Then, the portable terminal 4 determines whether the apparatus information table of the tool body 2 has a smart phone ID (Step S138).

If it determines that the apparatus information table of the tool body 2 does not have a correct smart phone ID (No for Step S138), then the portable terminal 4 displays, for example, "[!] This battery is not registered. Do you want to register it?" (Step S139). If the user does not request the registration (No for Step S140), then the portable terminal 4 displays, for example, "Without registration, this apparatus/battery can not be used." (Step S133) and ends the process.

If it determines that the apparatus information table of the tool body 2 has a smart phone ID (Yes for Step S138), or if the user requests the registration (Yes for S140), then the portable terminal 4 determines whether the apparatus information table of the tool body 2 has a battery ID (Step S141).

If it determines that the apparatus information table of the tool body 2 does not have the battery ID (No for Step S141), then the portable terminal 4 displays, for example, "[!] This battery is not registered. Do you want to register it?" (Step S142). If the user does not request the registration (No for Step S143), then the portable terminal 4 displays, for example, "Without registration, this apparatus/battery can not be used." (Step S133) and ends the process.

If it determines that the apparatus information table of the tool body 2 has a battery ID (Yes for Step S141), or if the user requests the registration (Yes for S143), then the portable terminal 4 determines whether the apparatus information table of the battery pack 3 has a tool body ID (Step S144).

If it determines that the apparatus information table of the battery pack 3 does not have a tool body ID (No for Step S144), then the portable terminal 4 displays, for example, "[!] This battery is not registered. Do you want to register it?" (Step S145). If the user does not request the registration (No for Step S146), then the portable terminal 4 displays, for example, "Without registration, this apparatus/battery can not be used." (Step S133) and ends the process.

If the user request the registration (Yes for Step S146), then the portable terminal 4 displays, for example, "Hold the portable terminal over an apparatus for authentication in order to register the smart phone ID and the tool body ID to the battery." (Step S147)

Then, the portable terminal 4 switches its near field radio communication function's Write mode to ON (Step S148), and writes the information to the battery pack 3 (Step S149).

Then, the portable terminal 4 displays, for example, "Hold the portable terminal over an apparatus for authentication in order to register the smart phone ID and the battery ID in the tool body."

Then, the portable terminal 4 switches its near field radio communication function's Write mode to ON (Step S151), and writes the information to the tool body 2 (Step S152).

When the authentication is successful by referring to the server for the battery ID and the tool body ID through server query (Yes for Step S128 in FIGS. 7A-7C), or when the process for the unavailable server communication is finished (Yes for Step S144, S152), as shown in FIGS. 7A-7C, the portable terminal 4 checks the battery status using pre-obtained battery information (Step S153), and displays the battery life, available operation time of battery, battery fatigue level, battery change indication, battery voltage LOW indication, etc. (Step S154).

Then, the portable terminal 4, using the near field radio communication function, requests for releasing the lock of the tool body 2 (Step S155), sets the use permission flag of the tool body information ON (Step S156), switches its near field radio communication function's Write mode to ON (Step S157), authenticates for writing permission (Step S158), and writes the information to the tool body 2 (Step S159). The portable terminal 4 can also set the use permission flag of the battery information ON.

Detailed processes of the tool body 2 are omitted here (will be provided later), but by having the use permission flag set ON, the tool body 2 becomes available to operate.

In the above discussion, i is assumed that the tool body 2 and the battery pack 3, as mainly shown in FIG. 4, respectively have the RFID chip 210 and the RFID chip 313. In this case, the portable terminal 4, in order to read/write data, communicates with both the tool body 2 and the battery pack 3. But as shown in FIG. 5, in the case where only the battery pack 3 has an RFID 313, the portable terminal 4 reads/writes data from/to a memory 212 of the tool body 2 utilizing the bi-directional communications between the CPU 310 of the battery pack 3 and the CPU 208 of the tool body 2.

Also, in the above discussion, the portable terminal 4 is held over the battery pack 3 first, and then, held over the tool body 2. It is possible to reverse the order of the sequence, so that the portable terminal 4 is held over the tool body 2 first, and then, held over the battery pack 3.

FIGS. 9A-9F and 10A-10F are drawings illustrating an example of a sequence of operations of a smart phone as the portable terminal 4 for the electric power tool 1. FIGS. 9A, 9B, 9C, 9D, 9E and 9F are drawings illustrating the operations of the portable terminal 4 in the case where the power supply of the electric power tool 1 is ON. FIGS. 10A, 10B, 10C, 10D, 10E and 10F are drawings illustrating the operations of the portable terminal 4 in the case where, first, the power supply of the electric power tool 1 is OFF, then after the main sequence of operations of the portable terminal 4, the power supply of the electric power tool 1 is switched to ON.

Figure 9A:
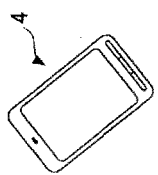
FIGS. 9A, 9B, 9C, 9D, 9E and 9F are drawings illustrating an example of a sequence of operations (No. 1) of a smart phone as a portable terminal for an electric power tool.
Figure 9B:
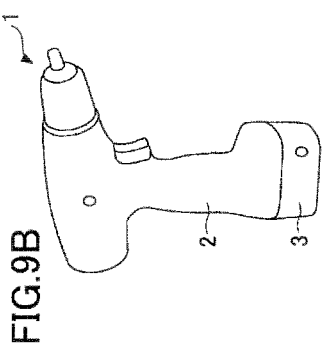
Figure 9C:
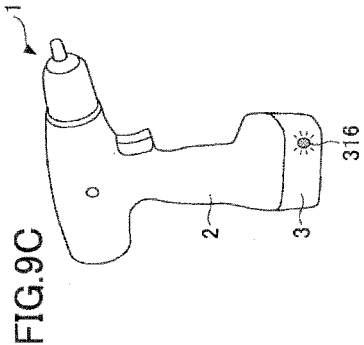
Figure 9D:
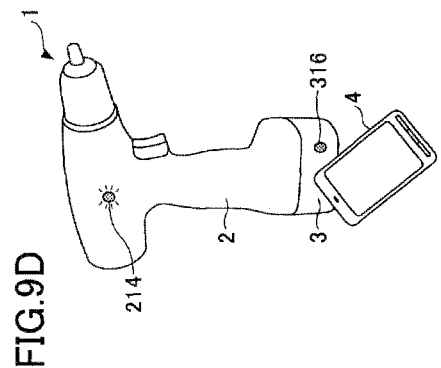

In FIG. 9A, the application of the portable terminal 4 is started. In FIG. 9B, the battery of the electric power tool 1 is switched to ON via the switch 204 (see FIG. 4, FIG. 5). As a result of this switching operation, the security LED 316 of the battery pack 3 starts blinking to indicate that the security protection is working, as shown in FIG. 9C.

In this blinking state, if, following the instruction displayed on the screen, the portable terminal 4 is held over the battery pack 3 and the authentication is successful, then the security LED 316 of the battery pack 3 becomes lit green showing that the security protection is released, and this time, the security LED 214 of the tool body 2 starts blinking to indicate that the security protection is working.

Figure 9E:
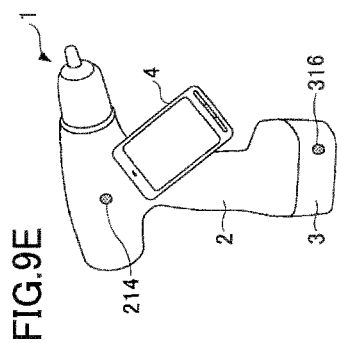
Figure 9F:
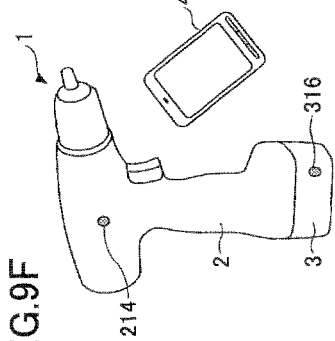

In this blinking state, if, as shown in FIG. 9E, following the instruction displayed on the screen, the portable terminal 4 is held over the tool body 2 and the authentication is successful, then the security LED 214 becomes lit green showing that the security protection is released, and the electrical power tool 1 becomes available to operate. And as shown in FIG. 9F, the result of the authentication and apparatus status information for the tool body 2 or the battery pack 3 are displayed on the screen of the portable terminal 4.

Figure 10B:
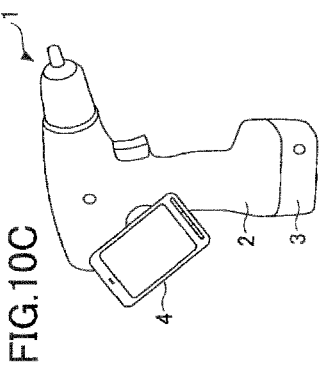
FIGS. 10A, 10B, 10C, 10D, 10E and 10F are drawings illustrating an example of a sequence of operations (No. 2) of a smart phone as a portable terminal for an electric power control.
Figure 10C:
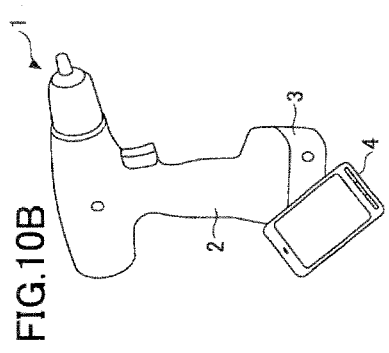
Figure 10A:
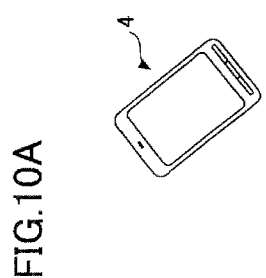

In FIG. 10A, the application of the portable terminal 4 is started. In FIG. 10B, the battery switch of the electric power tool 1 is OFF. Then, following the instruction displayed on the screen, the portable terminal 4 is held over the battery pack 3. And if the authentication is successful, then, although the security LED 316 of the battery pack 3 does not become lit green, the result of authentication is displayed on the screen of the portable terminal 4.

In this state, as shown in FIG. 10C, following the instruction displayed on the screen, the portable terminal 4 is held over the tool body 2 and the authentication is successful, then, although the security LED 214 of the tool body 2 does not become lit green, the result of authentication is displayed on the screen of the portable terminal 4.

Figure 10F:
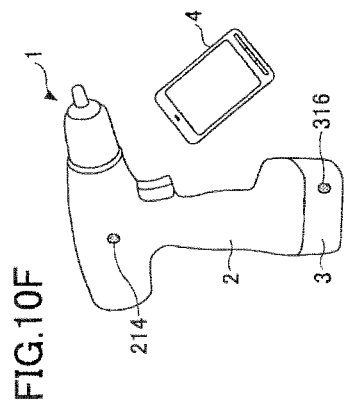
Figure 10E:
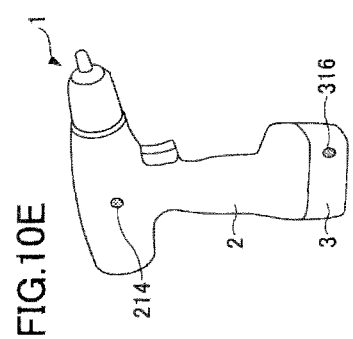
Figure 10D:
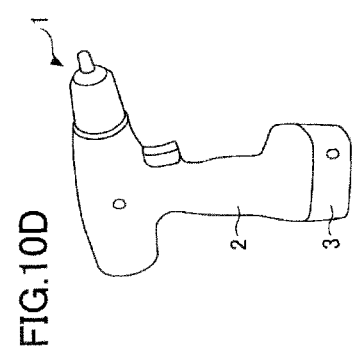

In this state, as shown in FIG. 10D, if, by switching the switch 204 (see FIG. 4, FIG. 5), the power supply of the electric power tool 1 is switched to ON. Then, as shown in FIG. 10E, the security LED 214 of the tool body 2 and the security LED 316 of the battery pack 3 become lit green and the electric power tool 1 becomes available to operate. And, as shown in FIG. 10F, the result of the authentication and apparatus status information for the tool body 2 or the battery pack 3 are displayed on the screen of the portable terminal 4.

FIG. 11 is a flowchart illustrating an exemplary process of the RFID chip 210 or the RFID chip 313.

In FIG. 11, when the RFID chip 210 or 313 starts to operate by getting power either from itself by receiving electromagnetic waves from outside and generating power, or from the tool body 2 or the battery pack 3, it goes into the passive mode (Step S202).

Then, if there is no module ID request o for Step S203), it goes back to the module ID request checking process(Step S203).

If there is a module ID request (Yes for Step S203), then it sends out its module ID (Step S204).

Then, if there is a memory read request (Yes for Step S205) and accompanying authentication of the key word is successful (Yes for Step S206), then it sends out the memory value (Step S205). If the memory value sending is not successful (No for Step S208), then it repeats sending out the memory value.

If a memory read request is not detected (No for Step 205), or if the read authentication is not successful (No for Step S206), or if the memory value sending is successful (Yes for Step S208), then, with a memory write request (Yes for Step S209) and a successful key word checking for authentication (Yes for Step S210), it requests for sending data (Step S211).

If it successfully receives the data (Yes for Step S212), then it writes the received data into the memory (Step S213). If writing the data is not successful (No for Step S214), then it repeats writing the data into the memory (Step S213).

If a memory write request is not detected (No for Step S209), or if the write authentication is not successful (No for Step S210), or if receiving the data is not successful (No for Step S212) if writing the data into the memory is complete (Yes for Step S214), then it goes back to the module ID request checking process (Step S203).

Figure 12:
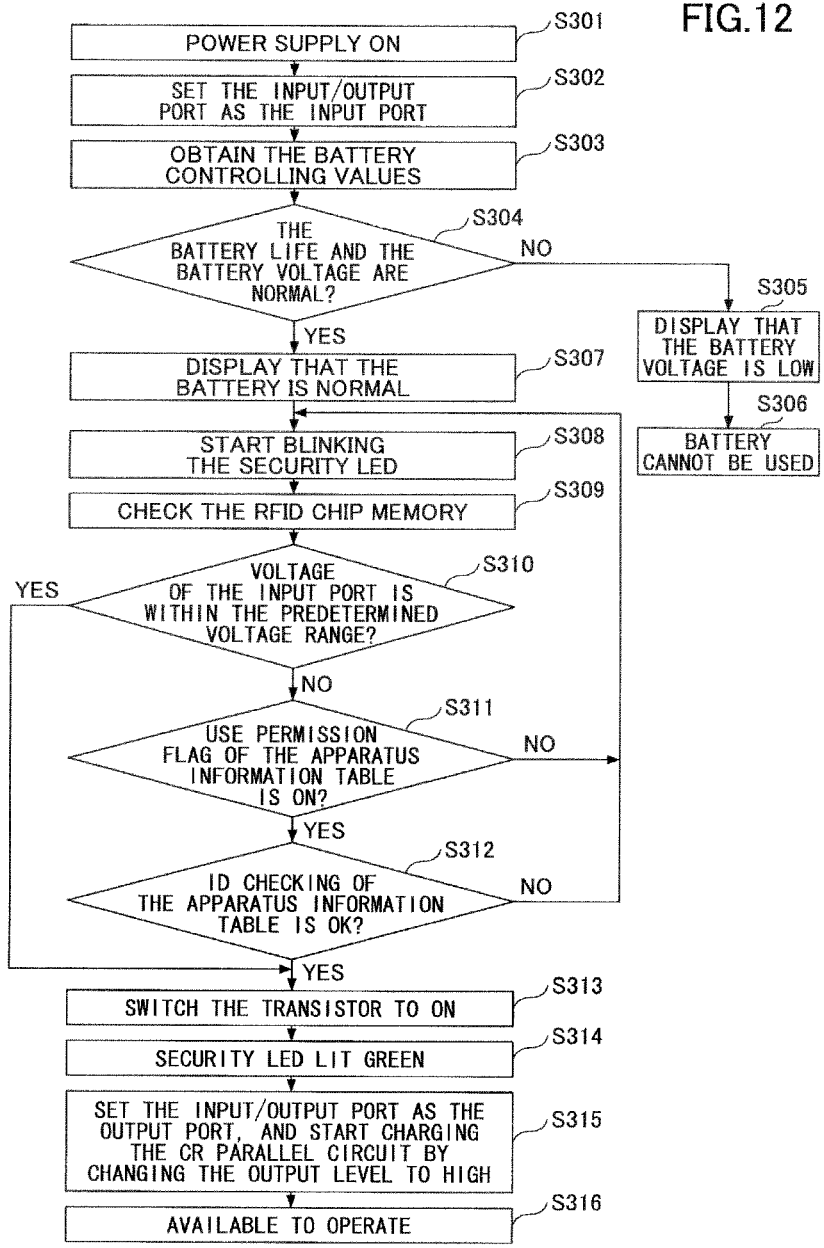
FIG. 12 is a flowchart illustrating an example of a process of a CPU embedded in a battery pack.

FIG. 12 is a flowchart illustrating an exemplary process of the CPU 310 embedded in the battery pack 3.

In FIG. 12, the power supply of the CPU 310 of the battery pack 3 is switched to ON by switching the switch 204 of the tool body 2 to ON (Step S301).

The CPU 310 sets the input/output port, to which the CR parallel circuit 311 is connected, as the input port (Step S302).

Then, the CPU 310 obtains the battery controlling values from the battery control circuit 304 (Step S303).

Then, the CPU 310, based on the obtained battery controlling values, determines whether the battery life and the battery voltage are normal (Step S304). If they are not normal (No for Step S304), then the CPU 310 displays, for example, that the battery voltage is LOW (Step S305), and, as the battery cannot be used, ends the process (Step S306).

If it determines that the battery life and the battery voltage are normal (Yes for Step S304), then the CPU 310 displays that the battery is normal (Step S307) and starts blinking the security LED (Step S308).

Then, the CPU 310 conducts the memory check of the RFID chip 313 (Step S309). Then, the CPU 310 determines whether the voltage of the input port, which is connected to the CR parallel circuit 311, is within the predetermined voltage range which corresponds to the predetermined elapsed time (e.g. one day) after the last normal usage (Step S310).

If it determines that the voltage of the input port is not within the voltage range (No for Step S310), then it determines whether the use permission flag of the apparatus information table is ON (Step S311). If the use permission flag is not ON (No for Step S311), then the CPU 310 goes back to the blinking the security LED process (Step S308). In the mean time, the RFID chip 313 can be accessed by the portable terminal 4, the data can be written, and the use permission flag can be set to ON.

If the CPU 310 determines that the use permission lag is ON (Yes for Step S311), then it conducts ID checking of the apparatus information table (Step S312). If the ID checking is not successful (No for Step S312), then the CPU 310 goes back to the blinking the security LED process (Step S308).

If the CPU 310 determines that the voltage of the input port is within the voltage range (Yes for Step S310), or if the ID checking of the apparatus information table is successful (Yes for Step S312), then the CPU 310 switches the transistor 312 to ON (Step S313), and the security LED becomes lit green (Step S314).

Then, the CPU 310 sets the input/output port, to which the CR parallel circuit 311 is connected, as the output port, and starts charging the CR parallel circuit 311 by changing the output level to High (Step S315) Then, the battery pack 3 becomes available to operate (Step S316).

FIG. 13 is a flowchart illustrating an exemplary process of the CPU 208 embedded in the tool body 2.

In FIG. 13, by switching the switch 204 of the tool body 2 to ON, the power supply of the CPU 208 of the tool body 2 becomes ON (Step S401).

The CPU 208 sets the input/output port which the CR parallel circuit 209 is connected, as the input port (Step S402).

Then, the CPU 208 starts blinking the security LED (Step S403).

Then, the CPU 208 conducts the memory check of the RFID chip 210 (Step S404). Then, the CPU 208 determines whether the voltage of the input port, which is connected to the CR parallel circuit 209, is within the predetermined voltage range which corresponds to the predetermined elapsed time (e.g. one day) after the last normal usage (Step S405).

If it determines that the voltage of the input port is not within the voltage range (No for Step S405), then it determines whether the use permission flag of the apparatus information table is ON (Step S406). If the use permission flag is not ON (No for Step S406), then the CPU 208 goes back to the blinking the security LED process (Step S403).

If the CPU 208 determines that the use permission flag is ON (Yes for Step S406), then it conducts ID checking of the apparatus information table (Step S407). If the ID checking is not successful (No for Step S407), then the CPU 208 goes back to the process of blinking the security LED (Step S403).

If the CPU 208 determines that the voltage of the input port is within the voltage range (Yes for Step S405), or if the ID checking of the apparatus information table is successful (Yes for Step S407), then the CPU 208 changes the tool body control output toward the motor control circuit 205 to ON (Step S408), and the security LED becomes lit green (Step S409).

Then, the CPU 208 sets the input/output port, to which the CR parallel circuit 209 is connected, as the output port, and starts charging the CR parallel circuit 209 by changing the output level to high (Step S410).

Then, the tool body 2 becomes available to operate (Step S411).

<Conclusion>

As described above, the present embodiment has the following advantages.

(1) A portable terminal works as an electrical key. And people, who try to steal an electric power tool, give up stealing because they may think, even if they successfully steal an electric power tool, they cannot use it because it is locked. As a result, the theft of electric power tools is effectively prevented without losing easy operability of the tools.

(2) It is difficult for a user to forget or lose an electrical key because his/her portable terminal, which he/she always carries with him/her, works as an electrical key.

(3) Various combinations of the battery pack and the tool body can be handled by separately maintaining the battery pack information, the tool body information, and their pairing information.

(4) By maintaining the correct pairing of the tool body and the battery pack, only the correct battery pack is used. Also, accidents caused by low quality batteries can be effectively prevented and the higher safety level can be achieved by checking the battery status. It becomes easier for the manufacturer of the electric power tool to provide consumers with the product safety warranty.

(5) The low cost with a small number of additional parts is achieved by adding only a CPU chip and an RFID chip to the existing electric power tool.

(6) Because the tool body information and the battery information are maintained by the server, the asset management of the electric power tool can be realized.

(7) It is possible to provide the electric power tool's battery life information and maintenance needs information based on the information maintained by the server (by displaying on the portable terminal's screen).

(8) Because it becomes easier for a user to exchange information with the manufacturer and the dealer through the network, it becomes possible to provide the easy operating environment for ordering batteries, inventory forecast management, notice for product recovery, etc.

(9) The present invention is not limited to be applied to an electric power tool but to any apparatus that has a battery pack removable from the apparatus body.

Further, the present invention is not limited to these embodiments, but various variations and modifications may be made without departing from the scope of the present invention.

The present application is based on and claims the benefit of priority of Japanese Priority Application No. 2012-133507 filed on Jun. 13, 2012, the entire contents of which are hereby incorporated by reference.

DESCRIPTION OF THE REFERENCE NUMERALS

1 Electric power tool
2 Tool body
201, 202 External connection terminal
203 Motor
204 Switch
205 Motor control circuit
206, 207 External connection terminal
208 CPU
209 CR parallel circuit
210 RFID chip
211 Diode
212 Memory
213 External connection terminal
214 Security LED
3 Battery pack
301, 302 External connection terminal
303 Battery cell
304 Battery control circuit
305 Transistor
306 Resistor
307 Thermistor
308, 309 External connection terminal
310 CPU
311 CR parallel circuit
312 Transistor
313 RFID chip
314 Diode
315 External connection terminal
316 Security LED
4 Portable terminal
5 Access point
6 Network
7 Information collection server
8 Manufacturer server

RELATED ART DOCUMENT

Patent document 1: Japanese Patent Application Publication No. 2004-181549

The invention claimed is:

1. An apparatus comprising:
an apparatus body;
a battery pack that is removable from the apparatus body and that supplies power to the apparatus body, wherein the apparatus body and the battery pack include respective memory units, the memory unit of the apparatus body storing a use permission flag that is written to the memory unit by a portable terminal, after authentication through near field communication between (i) the portable terminal and (ii) the battery pack and the apparatus body; and
a control unit to permit energization to operate the apparatus when the control unit determines after the authentication through near field communication between (i) and (ii) that the use permission flag of the memory unit is ON.

2. The apparatus as claimed in claim 1, wherein the battery pack includes a checking unit configured to check battery status and the control unit is configured to permit energization when the battery status is normal.

3. The apparatus as claimed in claim 1, wherein each of the apparatus body and the battery pack includes an RFID chip configured to communicate with the portable terminal through the near field communication.

4. The apparatus as claimed in claim 1, wherein the battery pack includes an RFID chip configured to communicate with the portable terminal, and the use permission flag of the memory unit of the apparatus body is written through the near field communication between the battery pack and the apparatus body.

5. The apparatus as claimed in claim 1, wherein the control unit includes a determining unit configured to determine an elapsed time between a last usage and a present usage, and when the elapsed time between the last usage and the present usage is less than a predetermined length of time, the control unit permits energization even if the use permission flag of the memory unit is not ON.

6. The apparatus as claimed in claim 1, wherein the apparatus is an electric power tool, and the apparatus body is a tool body.

7. An apparatus authentication management system comprising:
an apparatus body;
a battery pack that is removable from the apparatus body and that supplies power to the apparatus body; and
a portable terminal,
wherein the apparatus body and the battery pack include respective memory units, the memory unit of the apparatus body storing a use permission flag that is written to the memory unit by the portable terminal, after authentication through near field communication between (i) the portable terminal and (ii) the battery pack and the apparatus body; and
a control unit to permit energization to operate the apparatus when the control unit determines after the authentication through near field communication between (i) and (ii) that the use permission flag of the memory unit is ON.

8. An apparatus authentication method in an apparatus authentication system, the apparatus authentication system comprising an apparatus body, a battery pack that is removable from the apparatus body and that supplies power to the apparatus body, and a portable terminal, the apparatus body and the battery pack including respective memory units, the apparatus authentication method comprising:
storing, in the memory unit of the apparatus body, a use permission flag that is written to the memory unit by the portable terminal, after authentication through near field communication between (i) the portable terminal and (ii) the battery pack and the apparatus body; and
determining after the authentication through near field communication is performed between (i) and (ii) that the use permission flag of the memory unit is ON, and permitting energization to operate the apparatus when it is determined after the authentication through near field communication is performed between (i) and (ii) that the use permission flag of the memory unit is ON.

9. The apparatus authentication management system as claimed in claim 7, wherein the battery pack includes a checking unit configured to check battery status and the control unit is configured to permit energization when the battery status is normal.

10. The apparatus authentication management system as claimed in claim 7, wherein each of the apparatus body and the battery pack includes an RFID chip configured to communicate with the portable terminal through the near field communication.

11. The apparatus authentication management system as claimed in claim 7, wherein the battery pack includes an RFID chip configured to communicate with the portable terminal, and the use permission flag of the memory unit of the apparatus body is written through the near field communication between the battery pack and the apparatus body.

12. The apparatus authentication management system as claimed in claim 7, wherein the control unit includes a determining unit configured to determine an elapsed time between a last usage and a present usage, and when the elapsed time between the last usage and the present usage is less than a predetermined length of time the control unit permits energization even if the use permission flag of the memory unit is not ON.

13. The apparatus authentication management system as claimed in claim 7, wherein the apparatus is an electric power tool, and the apparatus body is a tool body.

14. The apparatus as claimed in claim 1, wherein the authentication of the apparatus through the portable terminal enables both (i) the operation of the apparatus and (ii) the charging of the battery pack.

15. The apparatus as claimed in claim 1, wherein when a non-registered battery pack compatible with the apparatus is connected in the apparatus body, the portable terminal causes the battery pack to be temporarily registered with the apparatus.

* * * * *